(12) United States Patent
Yang et al.

(10) Patent No.: US 11,876,299 B2
(45) Date of Patent: Jan. 16, 2024

(54) 5G BROADBAND DUAL-POLARIZED BASE STATION ANTENNA OF MULTIMODE RESONANCE STRUCTURE

(71) Applicant: Anhui University, Hefei (CN)

(72) Inventors: Lixia Yang, Hefei (CN); Dawei Ding, Hefei (CN); Aidi Ren, Hefei (CN); Zhixiang Huang, Hefei (CN); Guanghui Xu, Hefei (CN); Qian Chen, Hefei (CN); Xianliang Wu, Hefei (CN)

(73) Assignee: ANHUI UNIVERSITY, Hefei (CN)

( * ) Notice: Subject to any disclaimer, the term of this patent is extended or adjusted under 35 U.S.C. 154(b) by 80 days.

(21) Appl. No.: 17/695,471

(22) Filed: Mar. 15, 2022

(65) Prior Publication Data

US 2023/0006368 A1    Jan. 5, 2023

(30) Foreign Application Priority Data

Jul. 2, 2021   (CN) .......................... 202110751601.6

(51) Int. Cl.
*H01Q 25/00*   (2006.01)
*H01Q 21/26*   (2006.01)
*H01Q 1/24*    (2006.01)

(52) U.S. Cl.
CPC ............ *H01Q 25/001* (2013.01); *H01Q 1/24* (2013.01); *H01Q 1/246* (2013.01); *H01Q 21/26* (2013.01); *H01Q 25/00* (2013.01)

(58) Field of Classification Search
CPC ...... H01Q 25/001; H01Q 1/246; H01Q 21/26; H01Q 25/00; H01Q 1/24
USPC .......................................................... 343/702
See application file for complete search history.

(56) References Cited

U.S. PATENT DOCUMENTS

2015/0295313 A1*  10/2015  Zimmerman ............ H01Q 5/50
                                                              343/810

* cited by examiner

*Primary Examiner* — Hai V Tran
(74) *Attorney, Agent, or Firm* — Kirk A. Wilson; Joseph T. Guy; Patent Filing Specialist Inc.

(57) ABSTRACT

The present disclosure provides a 5th generation (5G) broadband dual-polarized base station antenna of a multimode resonance structure, including: a first resonance structure, a main radiating unit, a feed balun set, and a metal reflecting plate, where the feed balun set is disposed on the metal reflecting plate, the main radiating unit is disposed on a first feed balun and a second feed balun, and the first resonance structure is disposed on the main radiating unit; the main radiating unit includes a second resonance structure and a third resonance structure, the first resonance structure is configured to control a resonance point at a high frequency, and the third resonance structure is configured to control a resonance point at a low frequency; and the feed balun set is configured to provide a balance current for the main radiating unit and the first resonance structure.

5 Claims, 8 Drawing Sheets

5G BROADBAND DUAL-POLARIZED BASE STATION ANTENNA OF MULTIMODE RESONANCE STRUCTURE

CROSS REFERENCE TO RELATED APPLICATION(S)

This patent application claims the benefit and priority of Chinese Patent Application No. 202110751601.6, filed on Jul. 2, 2021, the disclosure of which is incorporated by reference herein in its entirety as part of the present application.

TECHNICAL FIELD

The present disclosure relates to the field of antenna technologies, in particular to a 5th generation (5G) broadband dual-polarized base station antenna of a multimode resonance structure.

BACKGROUND ART

With the advent of the 5G era, the Ministry of Industry and Information Technology of China has allocated new and higher frequency bands for operators to widen and use 5G, and the 5G frequency bands allocated for the operators are different. Specifically, China Mobile's 5G frequency bands are 2.515-2.675 GHz and 4.8-4.9 GHz; China Telecom's 5G frequency band is 3.4-3.5 GHz; and China Unicom's 5G frequency band is 3.5-3.6 GHz. How to use one antenna to cover all the forgoing 5G frequency bands has become the key to saving the site resources of the base station. The 5G frequency band, due to the relatively large frequency band span, is fully covered only by increasing the size of the traditional broadband base station antennas. However, increasing the antenna size and saving the site resources of the base station are contradictory.

SUMMARY

An objective of the present disclosure is to provide a 5G broadband dual-polarized base station antenna of a multimode resonance structure, for achieving broadband characteristics.

To implement the foregoing objective, the present disclosure provides the following solutions.

A 5G broadband dual-polarized base station antenna of a multimode resonance structure includes a first resonance structure, a main radiating unit, a feed balun set, and a metal reflecting plate, where the feed balun set is disposed on the metal reflecting plate, the main radiating unit is disposed on a first feed balun and a second feed balun, and the first resonance structure is disposed on the main radiating unit;

the main radiating unit includes a second resonance structure and a third resonance structure, the first resonance structure is configured to control a resonance point at a high frequency, and the third resonance structure is configured to control a resonance point at a low frequency; and the feed balun set is configured to provide a balance current for the main radiating unit and the first resonance structure.

Further, the first resonance structure is provided with a plurality of vias.

Further, the main radiating unit is provided with a plurality of vias.

Further, the feed balun set includes the first feed balun and the second feed balun, the first feed balun and the second feed balun have the same structure, each of the first feed balun and the second feed balun includes a F-shaped feed structure disposed on the front as well as metal patches, a groove, upper pins, and lower pins that are disposed on the back, the first feed balun and the second feed balun cross through the grooves, the upper pins run through the vias of the main radiating unit and the vias of the first resonance structure sequentially to provide the balance current for the main radiating unit and the first resonance structure, and fix the main radiating unit and the first resonance structure.

Further, the metal reflecting plate is provided with vias, and the lower pins run through the vias of the metal reflecting plate to fix the feed balun set and the metal reflecting plate.

Further, the metal reflecting plate is made of aluminium and is 1 mm thin.

Further, there are two upper pins and two lower pins.

Further, there are four vias on each of the main radiating unit, the first resonance structure, and the metal reflecting plate.

Based on specific embodiments provided in the present disclosure, the present disclosure has the following technical effects:

The 5G broadband dual-polarized base station antenna of a multimode resonance structure provided by the present disclosure includes: a first resonance structure, a main radiating unit, a feed balun set, and a metal reflecting plate, where the feed balun set is disposed on the metal reflecting plate, the main radiating unit is disposed on a first feed balun and a second feed balun, and the first resonance structure is disposed on the main radiating unit; the main radiating unit includes a second resonance structure and a third resonance structure, the first resonance structure is configured to control a resonance point at a high frequency, and the third resonance structure is configured to control a resonance point at a low frequency; and the feed balun set is configured to provide a balance current for the main radiating unit and the first resonance structure. The present disclosure adjusts the resonance point by changing the antenna structure parameters, and loads the first resonance structure above the antenna to produce a third resonance point. Under the combined action of three resonance points, the designed base station antenna achieves broadband characteristics.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. Based on the embodiments of the present disclosure, all other embodiments obtained by the person of ordinary skill in the art without creative efforts shall fall within the protection scope of the present disclosure.

An objective of the present disclosure is to provide a 5G broadband dual-polarized base station antenna of a multimode resonance structure, for achieving broadband characteristics. The present disclosure designs a broadband antenna with two resonance points first, and adjusts the resonance point by changing the antenna structure parameters, and loads the first resonance structure above the antenna to produce a third resonance point. Under the combined action of three resonance points, the designed base station antenna achieves broadband characteristics.

To make the foregoing objective, features, and advantages of the present disclosure clearer and more comprehensible, the present disclosure is further described in detail below with reference to the accompanying drawings and specific embodiments.

A 5G broadband dual-polarized base station antenna of a multimode resonance structure includes a first resonance structure, a main radiating unit, a feed balun set, and a metal reflecting plate, where the feed balun set is disposed on the metal reflecting plate, the main radiating unit is disposed on a first feed balun and a second feed balun, and the first resonance structure is disposed on the main radiating unit.

The first resonance structure, the main radiating unit, and the metal reflecting plate are provided with a plurality of vias.

The main radiating unit includes a second resonance structure and a third resonance structure, the first resonance structure is configured to control a resonance point at a high frequency, and the third resonance structure is configured to control a resonance point at a low frequency.

The feed balun set is configured to provide a balance current for the main radiating unit and the first resonance structure.

The feed balun set includes the first feed balun and the second feed balun, the first feed balun and the second feed balun have the same structure, each of the first feed balun and the second feed balun includes a F-shaped feed structure disposed on the front as well as metal patches, a groove, upper pins, and lower pins that are disposed on the back, the first feed balun and the second feed balun cross through the grooves, the upper pins run through the vias of the main radiating unit and the vias of the first resonance structure sequentially to provide the balance current for the main radiating unit and the first resonance structure, and fix the main radiating unit and the first resonance structure. The lower pins run through the vias of the metal reflecting plate to fix the feed balun set and the metal reflecting plate.

The operation bandwidth of the 5G broadband dual-polarized base station antenna of the multimode resonance structure in the present disclosure is relatively wide, and the 5G frequency band of China can be fully covered by using one antenna.

Specific Example

As shown in FIG. 1 to FIG. 6, a 5G broadband dual-polarized base station antenna based on a multimode resonance structure includes a main radiating unit (1002), a first resonance structure (1001), two feed baluns (1003) (1004) and a metal reflecting plate (1005). The main radiating unit (1002) is provided with two resonance structures (10021) (10022) adjusting different resonance points. The resonance structure (10021) controls the resonance point at a high frequency. The resonance structure (10022) controls the resonance point at a low frequency. In this case, the main radiating unit (1002) further has four vias (1100) (1101) (1102) (1103) that are connected to the feed baluns (1003) (1004). The first resonance structure (1001) is located on the main radiating unit (1002). The first resonance structure (1001) controls the position of the third resonance point. The first resonance structure (1001) also has four vias (1200) (1201) (1202) (1203) that are connected to the feed baluns (1003) (1004) respectively. The fronts of the feed baluns (1003) (1004) are F-shaped feed structures (10031) (10041). The backs are both two metal patches (10032) (10033) and (10042) (10043). The feed balun (1003) is provided with a groove (10034), which crosses with a groove (10044) on the feed balun (1004), so that the two feed baluns are fixed together. There are four pins (10035) (10036) (10037) (10038) and four pins (10045) (10046) (10047) (10048) on the upper and lower sides of the feed baluns (1003) (1004). The pins (10035) (10036) (10045) (10046) run through the vias (1101) (1102) (1100) (1103) in the main radiating unit (1002) and the vias (1201) (1202) (1200) (1203) in the first resonance structure (1001) to provide the balance current for the main radiating unit (1002) and the first resonance structure (1001) and fix the main radiating unit (1002) and the first resonance structure (1001). The pins (10037) (10038) (10047) (10048) run through vias (1301) (1302) (1300) (1303) in the metal reflecting plate (1005) to fix the feed baluns (1003) (1004) with the metal reflecting plate (1005). The metal reflecting plate (1005) is located at the bottom of the antenna structure, is made of aluminium, and is 1 mm thin.

Figure 1:
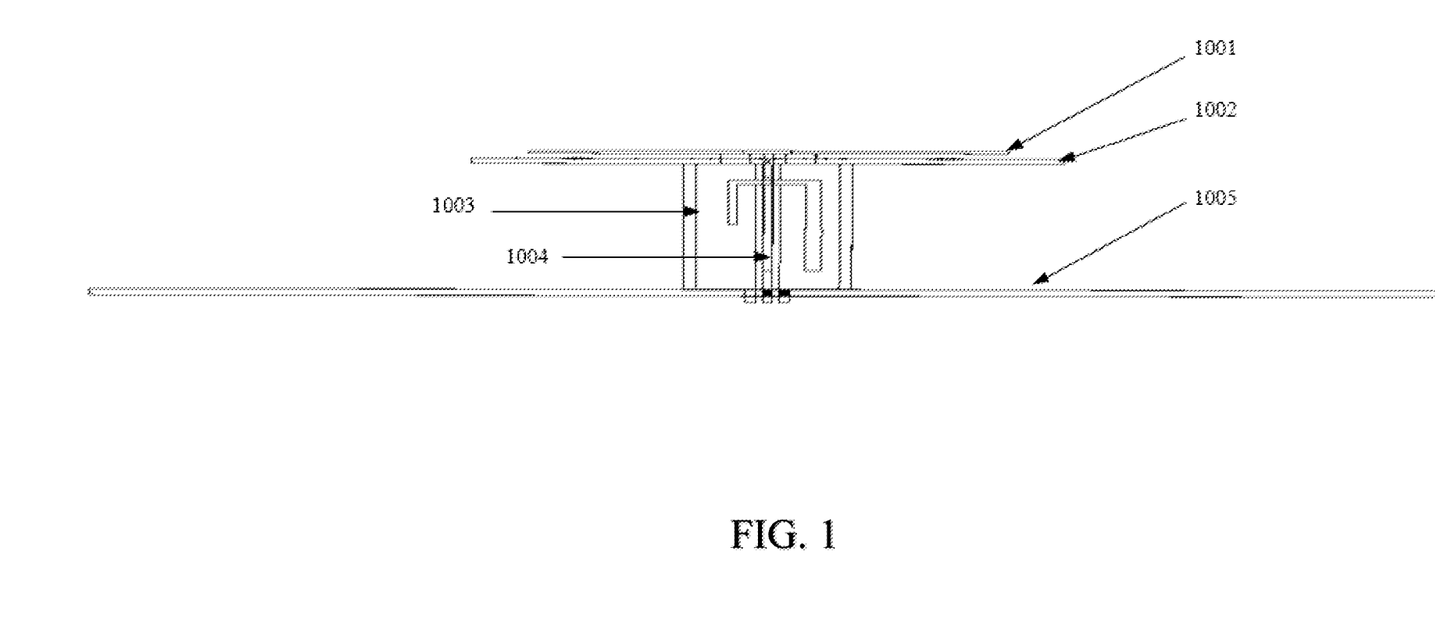
FIG. 1 is a front view of a 5G broadband dual-polarized base station antenna of a multimode resonance structure according to an embodiment of the present disclosure.
Figure 2:
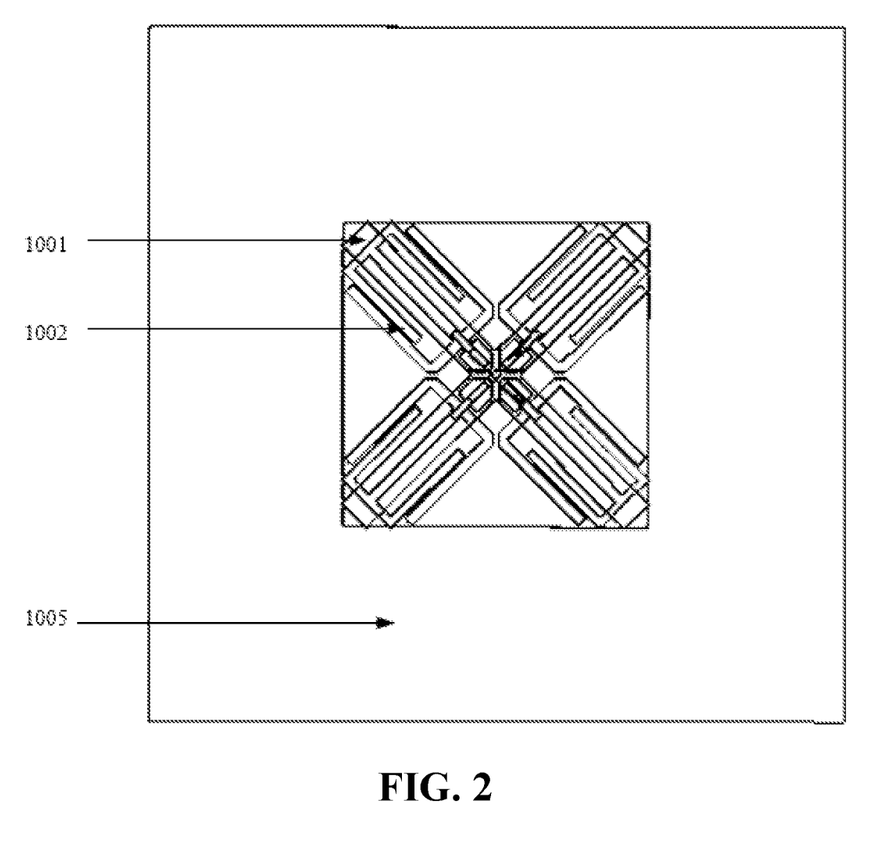
FIG. 2 is a radiation diagram of the 5G broadband dual-polarized base station antenna based on the multimode resonance structure according to an embodiment of the present disclosure.
Figure 3:
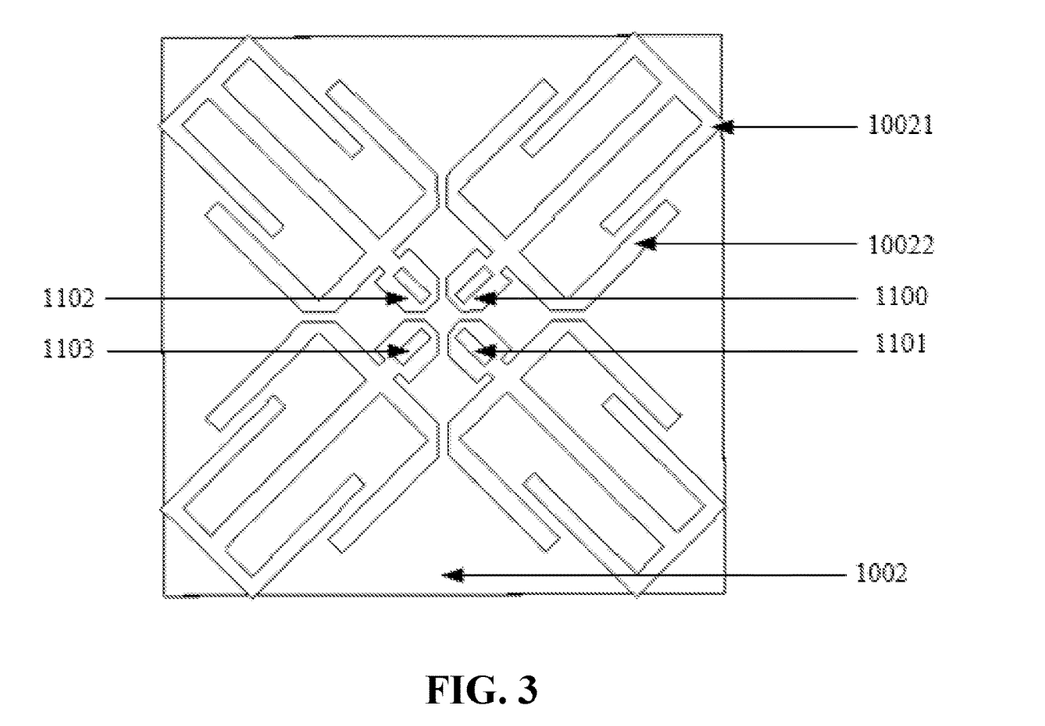
FIG. 3 is a schematic structural diagram of a main radiating unit according to an embodiment of the present disclosure.

The operation principle of the present disclosure is as follows: the operation frequency band of the 5G broadband dual-polarized base station antenna of the multimode resonance structure is 2.5-5.5 GHz. The main radiating unit (1002) is provided with the two resonance structures (10021) (10022). The resonance structure (10022) mainly generates a first resonance point. The position of the resonance point can be changed by adjusting the length of the resonance structure (10022) branch. The resonance structure (10021) mainly generates a second resonance point. The position of the second resonance point can be changed by adjusting the length of the resonance structure (10021) branch.

Figure 4:
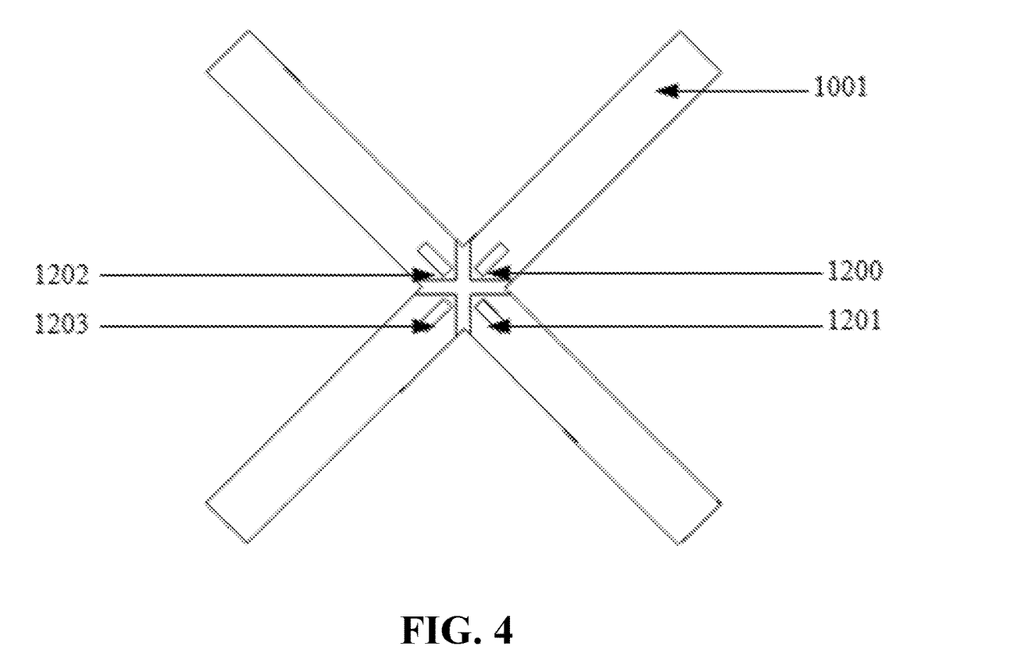
FIG. 4 is a schematic diagram of a first resonance structure according to an embodiment of the present disclosure.

The first resonance structure (1001) is located at the top of the antenna, and is fed by using the feed baluns (1003) (1004). The first resonance structure (1001) generates a third resonance point at a high frequency. The position of the third resonance point can be changed by changing the size of the first resonance structure (1001).

Figure 5:
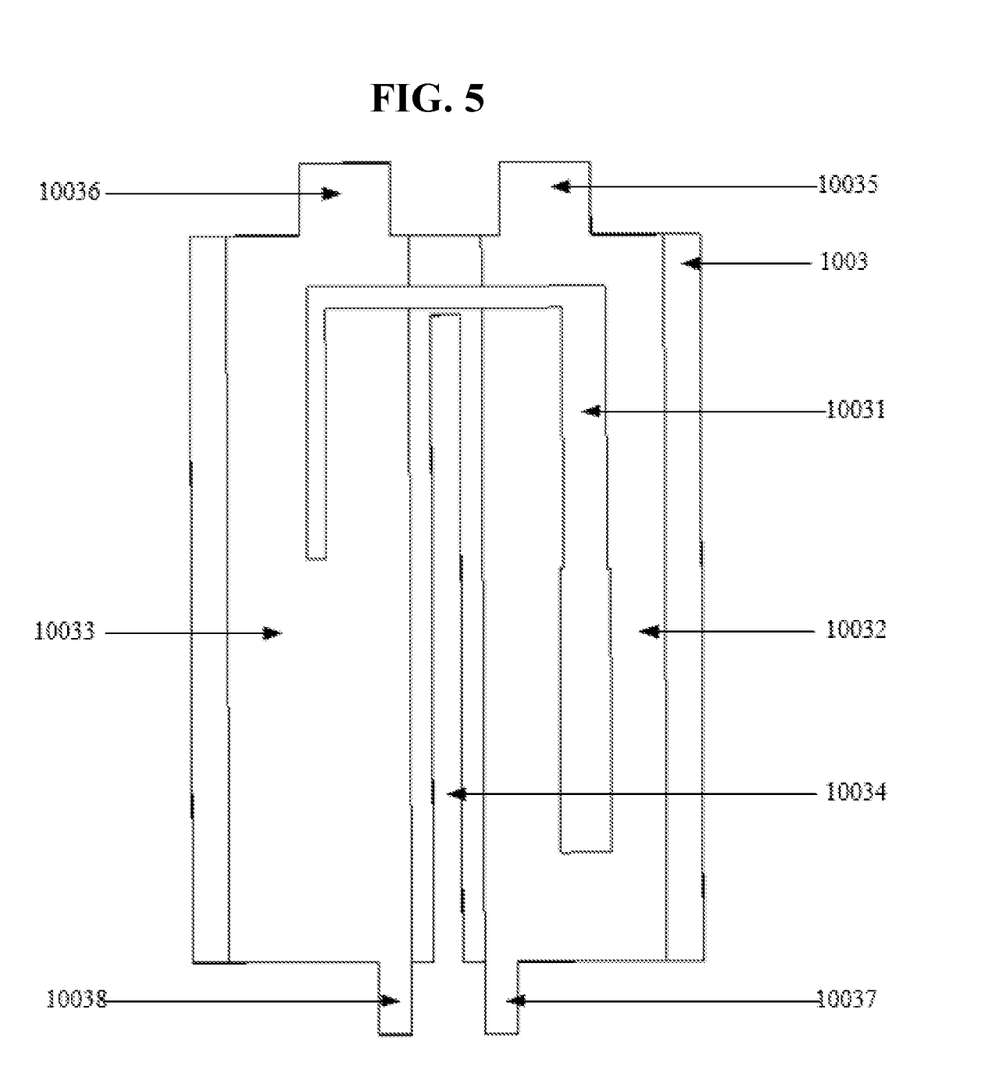
FIGS. 5 and 5A are schematic structural diagrams of feed balun sets according to embodiments of the present disclosure.
Figure 5A:
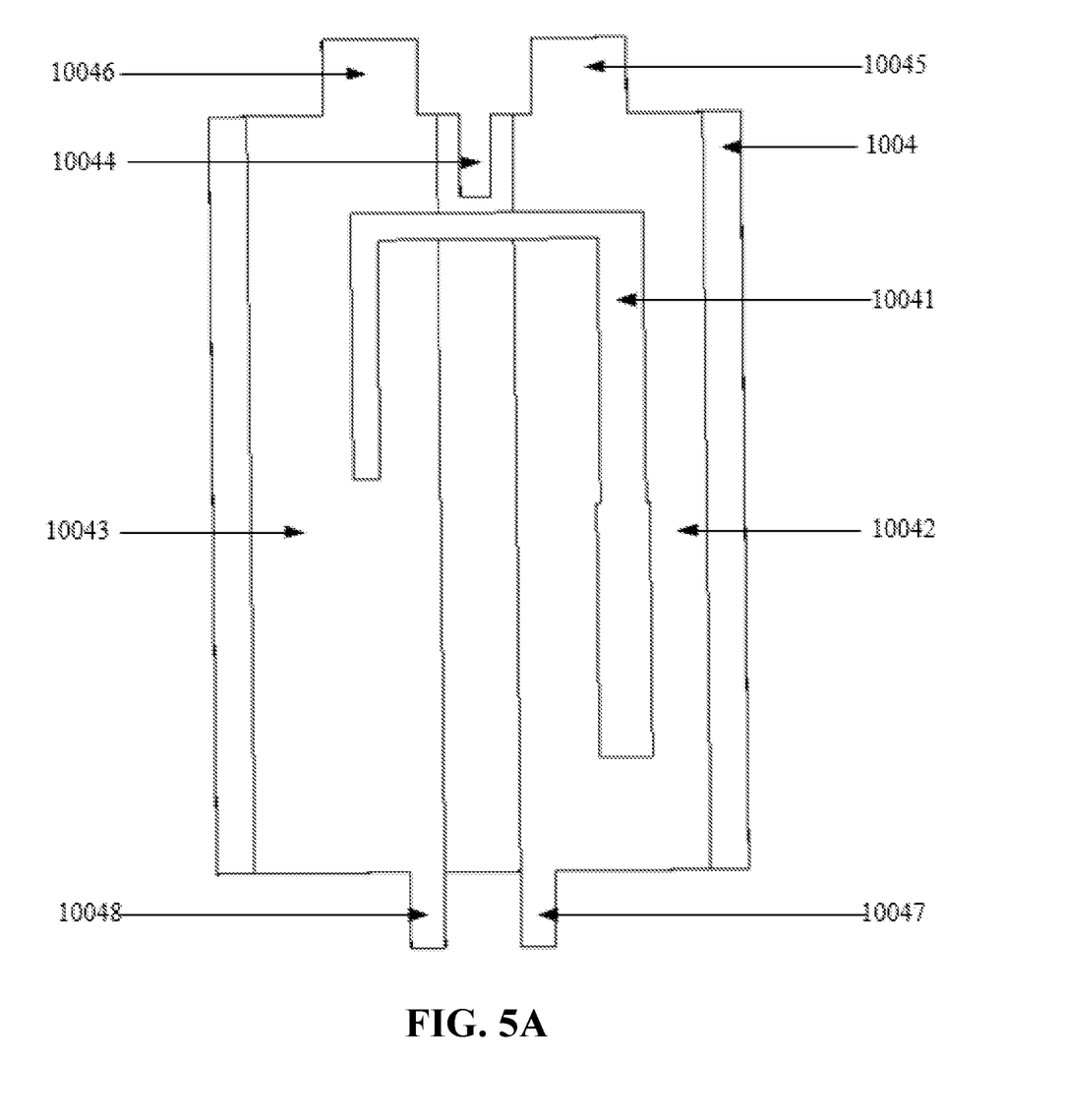

The feed baluns (1003) (1004) transform the provided unbalanced current into a balance current required by the main radiating unit (1002) and the first resonance structure (1001).

Figure 6:
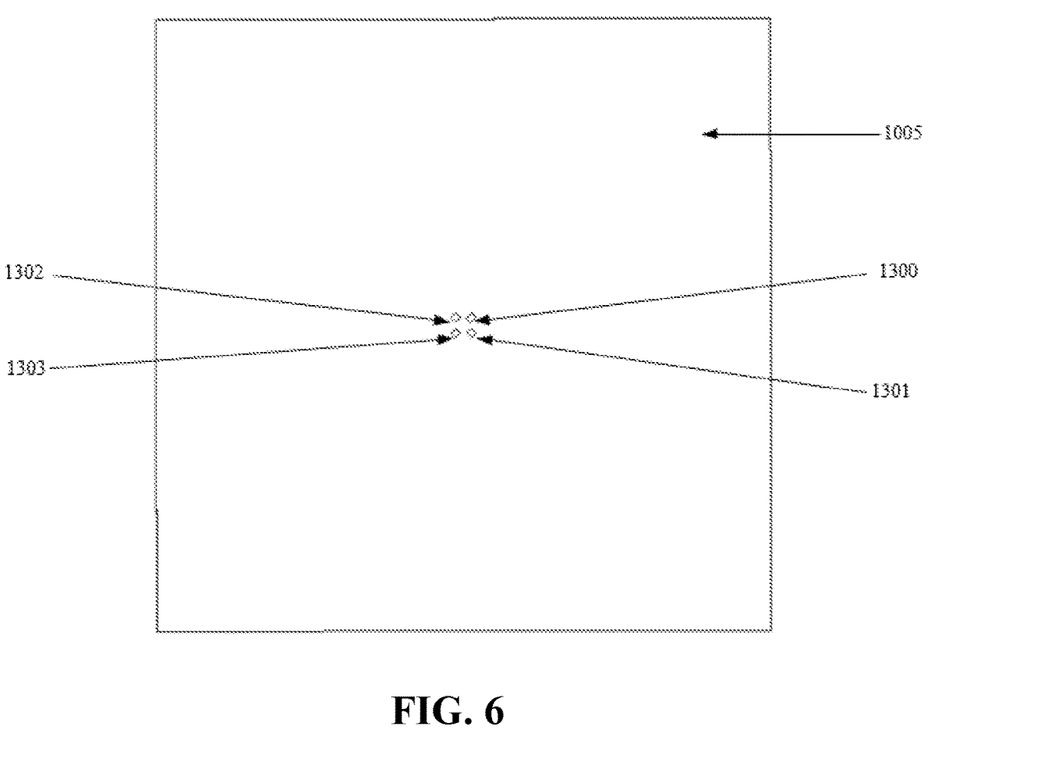
FIG. 6 is a schematic structural diagram of a metal reflecting plate according to an embodiment of the present disclosure.

The metal reflecting plate (1005) decreases backward radiation of each antenna unit to increase the antenna gain.

The main radiating unit (1002) generates two resonance points at a relatively low frequency band. When the positions of the two resonance points are close to each other, the bandwidth of the antenna can achieve a return loss greater than 10 dB in a frequency band. The resonance structure (10022) generates the first frequency point. The position of the first resonance point can be changed by adjusting the size of the branch on the resonance structure (10022), while the adjacent resonance structures are coupled to widen the bandwidth. The resonance structure (10021) generates a second resonance point. The position of the second resonance point can be shifted by changing the size of the branch on the resonance structure (10021), while the resonance structure (10021) and the resonance structure (10022) are coupled to further widen the bandwidth generated by the second resonance point. The positions of the two resonance points are changed by properly adjusting the size of the branches on the two resonance structures (10021) (10022). Under the combined action of the two generated resonance points, the antenna achieves a return loss greater than 10 dB in a relatively low frequency band. The third resonance point can be generated by loading the first resonance structure (1001) above the main radiating unit (1002). The position of the resonance point is at a high frequency. The position of the third resonance point is adjusted by properly changing the size of the first resonance structure (1001). The antenna's final antenna return loss is greater than 10 dB in the 2.5-5.5 GHz frequency band.

Figure 7:
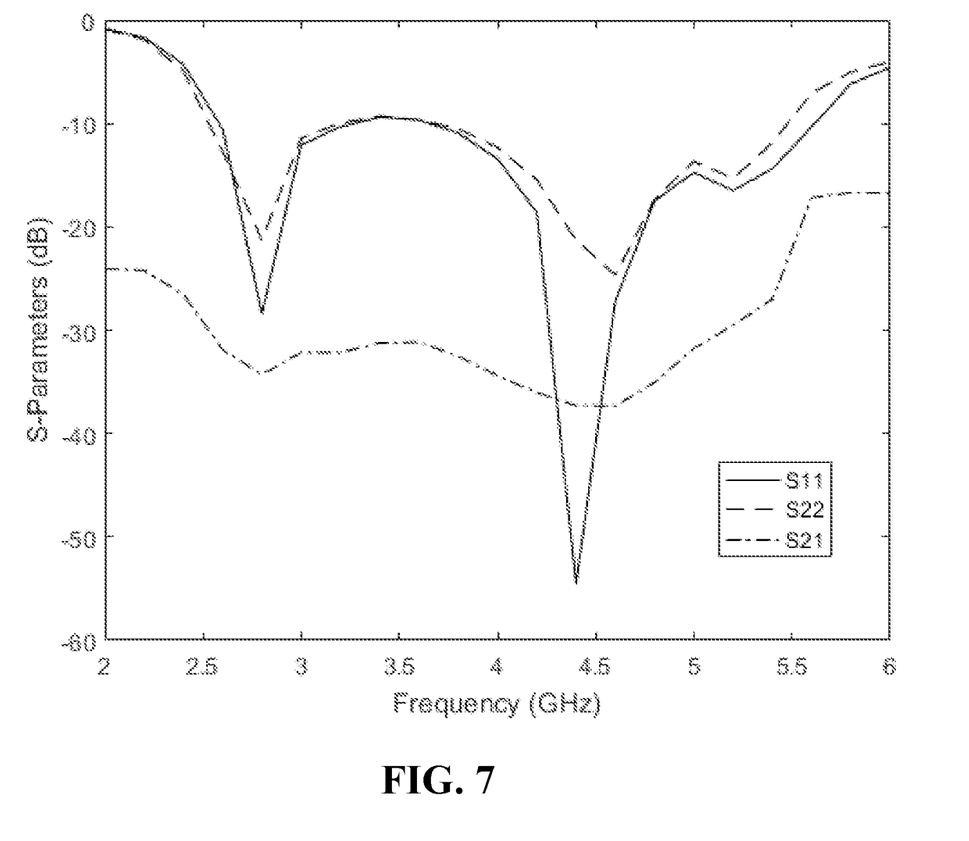
FIG. 7 is a schematic diagram of $S_{11}$ and $S_{21}$ of two ports of the 5G broadband dual-polarized base station antenna of a multimode resonance structure according to an embodiment of the present disclosure.
Figure 8:
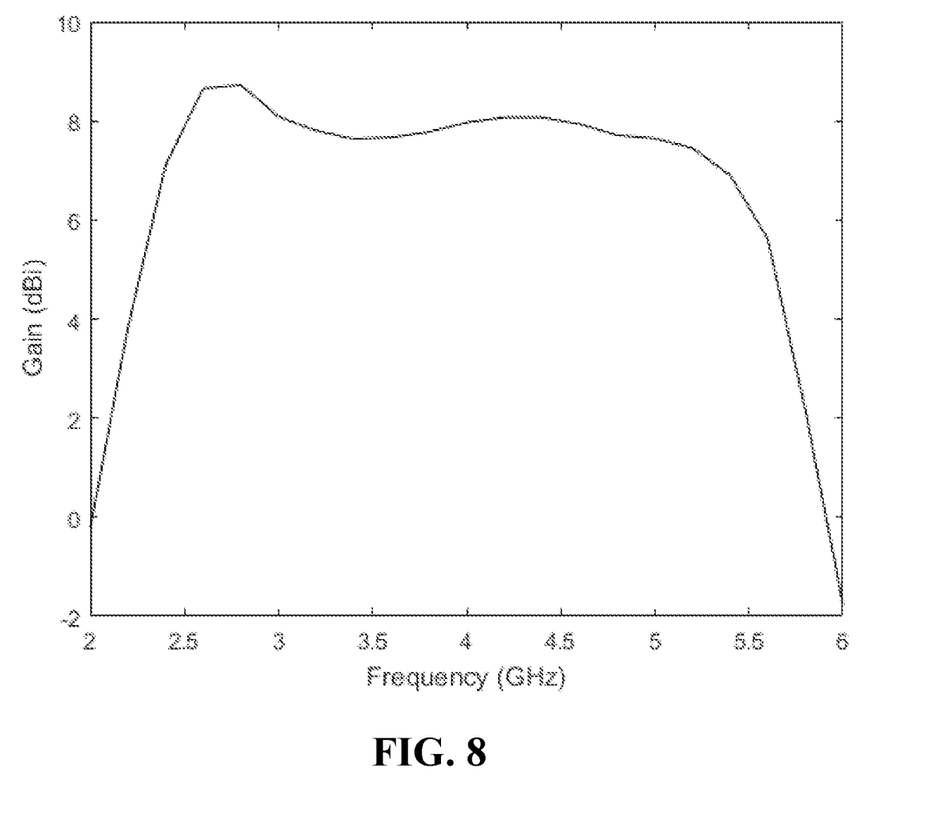
FIG. 8 is a schematic diagram of gains of the 5G broadband dual-polarized base station antenna of the multimode resonance structure at each frequency point according to an embodiment of the present disclosure.

The simulation results of the 5G broadband dual-polarized base station antenna of a multimode resonance structure are shown in FIG. 7 and FIG. 8. Adjusting the resonance structure (10022) on the main radiating unit (1002) enables the generated resonance point to be located near 2.7 GHz, the resonance point generated by the resonance structure (10021) to be located near 4.4 GHz, and the resonance point generated by the resonance structure (1001) to be located near 5.1 GHz. Under the combined action of the three resonance points, the operation bandwidth of the antenna is 2.5-5.5 GHz, while the port isolation is greater than 30 dB. The simulation result of the gain of the 5G broadband dual-polarized base station antenna of the multimode resonance structure at each frequency point is shown in FIG. 8, showing that the gains of the antenna in its operation frequency band are relatively stable.

Each embodiment of this specification is described in a progressive manner, each embodiment focuses on the difference from other embodiments, and the same and similar parts between the embodiments may refer to each other.

In this specification, some specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A 5th generation (5G) broadband dual-polarized base station antenna of a multimode resonance structure, comprising a first resonance structure, a main radiating unit, a feed balun set, and a metal reflecting plate, wherein the feed balun set is disposed on the metal reflecting plate, the main radiating unit is disposed on a first feed balun and a second feed balun, and the first resonance structure is disposed on the main radiating unit;

the main radiating unit comprises a second resonance structure and a third resonance structure, the first resonance structure is configured to control a resonance point at a high frequency, and the third resonance structure is configured to control a resonance point at a low frequency;

the feed balun set is configured to provide a balance current for the main radiating unit and the first resonance structure;

the first resonance structure is provided with a plurality of vias;

the main radiating unit is provided with a plurality of vias; and the feed balun set comprises the first feed balun and the second feed balun, the first feed balun and the second feed balun have the same structure, each of the first feed balun and the second feed balun comprises a Γ-shaped feed structure disposed on the front as well as metal patches, a groove, upper pins, and lower pins that are disposed on the back, the first feed balun and the second feed balun cross through the grooves, the upper pins run through the vias of the main radiating unit and the vias of the first resonance structure sequentially to provide the balance current for the main radiating unit and the first resonance structure, and fix the main radiating unit and the first resonance structure.

2. The 5G broadband dual-polarized base station antenna of a multimode resonance structure according to claim 1, wherein the metal reflecting plate is provided with vias, and the lower pins run through the vias of the metal reflecting plate to fix the feed balun set and the metal reflecting plate.

3. The 5G broadband dual-polarized base station antenna of a multimode resonance structure according to claim 2, wherein there are four vias on each of the main radiating unit, the first resonance structure, and the metal reflecting plate.

4. The 5G broadband dual-polarized base station antenna of a multimode resonance structure according to claim 1, wherein the metal reflecting plate is made of aluminium and is 1 mm thin.

5. The 5G broadband dual-polarized base station antenna of a multimode resonance structure according to claim 1, wherein there are two upper pins and two lower pins.

* * * * *